Aug. 17, 1948. B. E. SIMONTON ET AL 2,447,285
PALLET
Filed Oct. 8, 1946
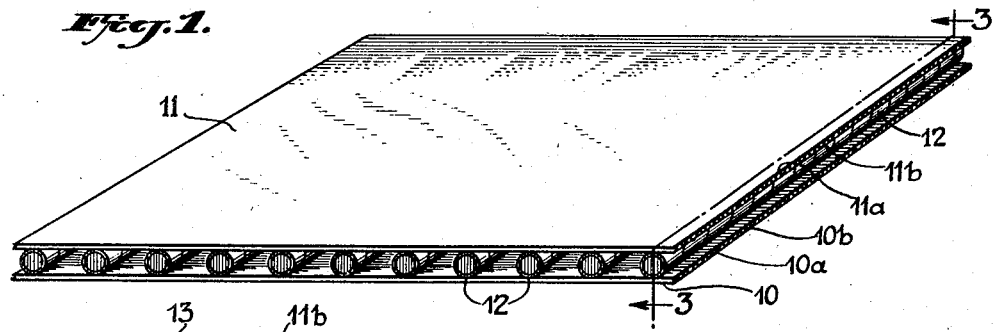
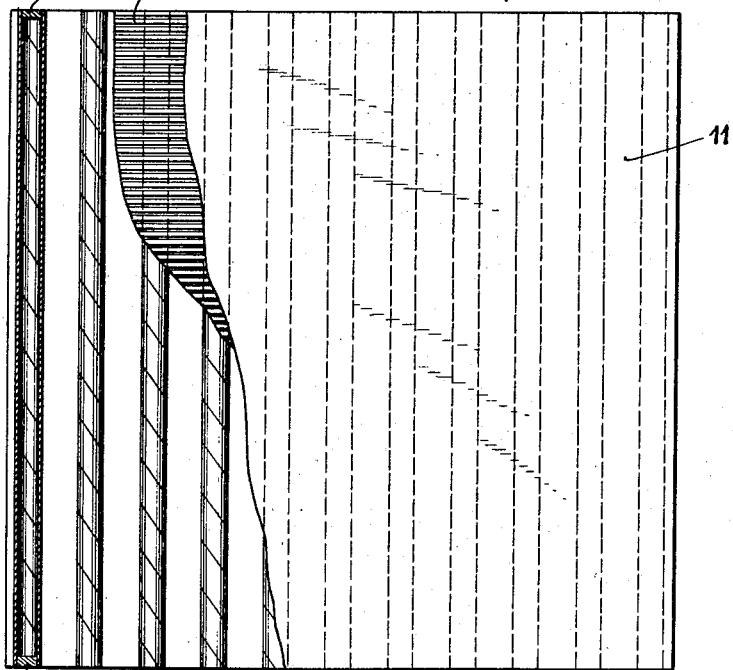
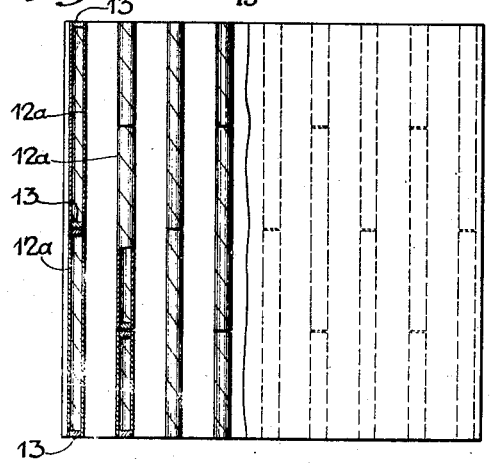
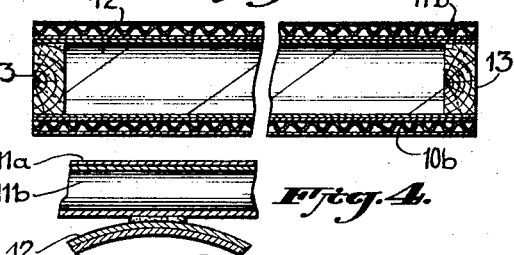
INVENTORS.
BUDD E. SIMONTON.
HOWARD J. DYER.
BY Ward, Crosby & Neal
ATTORNEYS.

Patented Aug. 17, 1948

2,447,285

UNITED STATES PATENT OFFICE 2,447,285

PALLET

Budd E. Simonton and Howard J. Dyer, Watertown, N. Y., assignors to St. Regis Paper Company, New York, N. Y., a corporation of New York Application October 8, 1946, Serial No. 701,868

1 Claim. (Cl. 248—120)

This invention relates to material handling platforms, and more particularly to platforms which are known as pallets which may be employed in connection with fork lift trucks, for storing, handling and transporting materials which may be mounted upon the pallets.

Such pallets normally are adapted to be used with hand or power-operated fork lift trucks for handling materials which may be in loose form or in boxes, stacks of empty bags, crates, bales, bundles and the like.

Pallets which have been heretofore proposed and which are in common use are constructed substantially entirely of wood. They present sharp or rough edges which tend to injure workmen and normally are of thick and heavy construction.

One of the many disadvantages in the use of pallets which have been employed heretofore has been the expense thereof. The initial cost of heavy wooden pallets commonly in use has been high and in order to attain some measure of economy, many manufacturers and material handling enterprises have shipped palletized loads to their destination and thereafter have required that the pallets be returned. This, of course, involves the cost of return shipment of the pallets and diminishes the importance of this measure as a means for economizing.

It is obvious that the wooden pallets which normally are in use are of considerable weight and their shipping cost, not only to the point of destination but also to the point of departure may constitute an appreciable item of expense. Many types of pallets employ not only wood but metal, thus increasing their cost of manufacture and cost of shipment.

Certain manufacturers who employ pallets have found it burdensome to require the return of the pallets and consequently have been forced to add the cost of the pallets to the material which is palletized during shipment and handling. It is possible for the cost of the pallet materially to influence the retail cost of the material sold. In certain industries, such as in the paper bag industry, where unit costs are extremely low, the use of such a heavy and expensive pallet has proved uneconomical. That is, the savings which are effected in the storage and in the handling of such material have been less than the cost of the pallet. This circumstance may exist not only where the pallet is returned but where the pallet is not returned.

The extraordinary benefits which may be obtained from the use of pallets thus may not be within the reach of manufacturers of certain items and a real and pressing problem thus has arisen to provide an extremely inexpensive pallet which is light in weight, simple, and easy to manufacture.

Many pallets in common use require the use of special materials for their manufacture which, as above mentioned, are expensive and which require considerable labor to assemble.

According to the present invention, a novel pallet is provided which will eliminate the above noted difficulties.

Various further and more specific features and advantages of the invention will clearly appear from the detailed description given below taken in connection with the accompanying drawings which form a part of the specification and illustrate, by way of example, preferred arrangements of the device for carrying out the invention. The invention consists in such novel combinations and features as may be shown and described in connection with the device herein disclosed.

In the drawings:

Fig. 1 is an isometric view with parts broken away of one embodiment of the invention;

Fig. 2 is a plan view of the embodiment shown in Fig. 1;

Fig. 3 is a sectional view taken on line 3—3 of Fig. 1;

Fig. 4 is a sectional view with parts broken away of a cylindrical spacer member in cooperation with a pallet face; and Fig. 5 is a plan view with parts broken away of a second embodiment of the invention.

Referring to the drawings in further detail, an inexpensive and simple pallet is provided comprising parallel faces of preferably corrugated cardboard having interposed therebetween stiff cylindrical members, preferably of paper, the longitudinal axes of which are parallel to said faces and which are secured thereto by a suitable cementitious substance or adhesive.

In the embodiment shown in Fig. 1, the pallet comprises a bottom face or base portion 10 which is preferably square in shape and which, for example, may be 4 feet on an edge. The upper face or platform portion 11 is parallel to the base 10 and is held in parallel spaced relation thereto by means of a plurality of hollow cardboard cylinders 12. The base 10 and the platform 11 preferably are constructed of corrugated cardboard and the hollow cylinders 12 also are of cardboard but are not necessarily corrugated.

In paper mills, for example, where paper containers or paper bags are manufactured, there is normally a plentiful supply of hollow cardboard cylinders which normally are employed as spools on which paper stock is wound. Large accumulations of such spools occur in every plant employing such paper for the manufacture of containers. Consequently, such hollow cardboard cylinders, which normally are discarded, may be easily available and may be extremely inexpensive. The corrugated cardboard faces 10 and 11 are also relatively inexpensive.

In the preferred embodiment illustrated in the drawings, the spacers 12 are arranged in parallel rows, each row containing one or more coaxial spacers. The above mentioned hollow cylindrical spacers 12 may be continuous throughout the length of the pallet as shown in the embodiment of Fig. 1 and Fig. 2. In the embodiment of Fig. 5 a plurality of coaxial cylindrical spacers 12a may be employed in parallel rows. In the form shown (Fig. 5) the rows each comprise alternately two and three coaxial spacers.

In order to strengthen the spacers and to assist them in withstanding considerable loads, suitable plugs 13, for example, of wood, may be inserted in the ends thereof and there retained by a suitable adhesive or by friction. Such plugs may be necessary to support that portion of a load near the margin of the pallet.

The pallet illustrated in the drawings constitutes a so-called "two-way" pallet. That is, the fork of a lift truck may approach the pallet and lift same from two directions which are opposed to one another by 180 degrees.

The cylindrical spacers 12, as above mentioned, may be adhesively secured to the faces (Fig. 4) and/or they may be secured by conventional staples. It is desirable for the spacers 12 to be closely adjacent parallel outer edges 10a and 11a in order to avoid a collapsing thereof under load.

In order to obtain greater strength and in order to avoid a collapsing of the platform at points intermediate the spacers, the latter are placed preferably transversely to the corrugations within the base and the platform. This is indicated in Figs. 1, 2, 3 and 5 wherein the spacers 12, for example, are placed at 90 degrees to the corrugations 10b and 11b. The spacers instead of being disposed at 90 degrees to the corrugations may be disposed obliquely relative thereto. If it is desired, a plurality of layers of corrugated cardboard may be employed as a base or as a platform instead of a single layer as shown in the figures. Where a plurality of layers are so employed the corrugations thereof preferably are disposed transversely to one another.

In order to minimize the tendency of the platform to compress under load, the interval between the extremities of coaxial and adjacent spacers may be small and preferably of the order of 3 or 6 inches.

The above described pallet may be constructed of readily available and inexpensive materials and thus is of extraordinarily low cost. It permits of the handling of certain types of material, for example, paper bags with extreme economy which heretofore has been impossible because of the expense of construction and of shipping of previously proposed pallets.

The cylindrical cardboard spacers have a considerable resilience which is significant in that, coupled with the resilience of the corrugated faces, it tends to distribute a load uniformly over a pallet. Also said resilience has the effect of increasing the area of contact between the faces and the spacers when a load is acting thereon. This increases the area of support and in general adds to the ability of the apparatus uniformly to support a load. The area of support may be increased several times by virtue of said resilience. The unusually low cost of this type of pallet makes it possible for the manufacturer to discard the pallet if so desired without an appreciable addition to the cost of the material which has been palletized. Normally, there may be no necessity to return a pallet of this description. However, if it is desired to do so, it is light-weight and the ease with which it may be handled minimizes the cost of return shipment.

Large quantities of materials such as paper containers, for example, flat paper bags, may be handled with greater speed and lower handling costs and with safety and efficiency with this type of pallet. It has been found that this particular type of pallet will stand a load up to 250 pounds per square foot. Thus, a pallet 4 feet on an edge will take a load of 4,000 pounds.

While the invention has been described with respect to a preferred example which has given satisfactory results, it will be understood by those skilled in the art after understanding the invention, that various changes and modifications may be made without departing from the spirit and scope of the invention and it is intended, therefore, in the appended claim, to cover all such changes and modifications.

What is claimed as new and desired to be secured by Letters Patent is:

A two-faced pallet for use with lifting trucks having lift fingers, comprising a base member of double-faced corrugated paperboard; a platform member also of double-faced corrugated paperboard; a plurality of relatively stiff, hollow, cylindrical cardboard spacer members interposed between and in substantially tangential relation to said base and platform members, the longitudinal axes of said spacer members extending parallel to said paperboard members and parallel to one another, said spacer members being in spaced relationship to permit the insertion therebetween of lift fingers, said spacer members being adhered to said base and platform members along lines of tangency therebetween, whereby the pressure of a load applied to said pallet will be exerted between said base, platform and spacer members at the adhered lines of tangency thereof and the corrugated material will yield to increase the area of contact of said spacer members with said base and platform members to distribute the load over a larger area without abrupt deformation of any of said members; and a plurality of block members mounted respectively in each extremity of each of said spacer members to stiffen same.

BUDD E. SIMONTON.
HOWARD J. DYER.

REFERENCES CITED

The following references are of record in the file of this patent:

UNITED STATES PATENTS

| Number | Name | Date |
| --- | --- | --- |
| 941,745 | Van Nostrand | Nov. 30, 1909 |
| 1,754,784 | Borsodi | Apr. 15, 1930 |
| 1,931,458 | Lang | Oct. 17, 1933 |